US008034851B1

(12) United States Patent
Klemarczyk

(10) Patent No.: US 8,034,851 B1
(45) Date of Patent: Oct. 11, 2011

(54) ANAEROBIC CURE SYSTEMS FOR AN ANAEROBIC CURABLE COMPOSITIONS, AND ANAEROBIC CURABLE COMPOSITIONS CONTAINING SAME

(75) Inventor: Philip T. Klemarczyk, Canton, CT (US)

(73) Assignee: Henkel Corporation, Rocky Hill, CT (US)

( * ) Notice: Subject to any disclaimer, the term of this patent is extended or adjusted under 35 U.S.C. 154(b) by 149 days.

(21) Appl. No.: 12/277,932

(22) Filed: Nov. 25, 2008

(51) Int. Cl.
*C09J 4/00* (2006.01)

(52) U.S. Cl. ........ 523/176; 526/204; 526/205; 526/319; 526/320; 526/328; 526/329.7; 526/217; 526/218.1; 526/219.1; 526/219.2; 526/219.3; 526/227; 526/229; 526/229.5; 526/195; 526/197; 528/271; 428/63; 427/207.1; 427/208; 427/209; 427/331; 252/186.1; 252/186.38; 252/186.39; 252/186.42; 252/186.43; 252/186.44; 252/188.1; 252/188.25

(58) Field of Classification Search ............... 528/271; 526/319, 320, 328, 329.7
See application file for complete search history.

(56) References Cited

U.S. PATENT DOCUMENTS

| | | | |
|---|---|---|---|
| 3,980,627 A * | 9/1976 | McDowell et al. | 526/323.1 |
| 4,287,350 A | 9/1981 | Huellstrung et al. | |
| 4,321,349 A | 3/1982 | Rich | |
| 4,374,940 A * | 2/1983 | Bhatia | 523/176 |
| 4,906,684 A * | 3/1990 | Say | 524/548 |
| 5,605,999 A | 2/1997 | Chu et al. | |
| 5,811,473 A | 9/1998 | Ramos et al. | |
| 6,043,327 A | 3/2000 | Attarwala et al. | |
| 6,451,948 B1 * | 9/2002 | Woods et al. | 526/313 |
| 6,958,368 B1 * | 10/2005 | Klemarczyk et al. | 523/176 |
| 7,411,009 B1 | 8/2008 | Messana et al. | |
| 2005/0070622 A1 * | 3/2005 | Kalgutkar et al. | 522/1 |

OTHER PUBLICATIONS

Travis et al., "Preparation of Purified KHSO5•H20 and nBU4NHSO5 from Oxone by Simple and Efficient Methods", Eur. J. Org. Chem., 20, 3429-34 (2002).*
Definition of "per-" Hawley's Condensed Chemical Dictionary, 14th Ed., 2002.*
R.D. Rich, "Anaerobic Adhesives" in Handbook of Adhesive Technology, 29, 467-79, A. Pizzi and K.L. Mittal, eds., Marcel Dekker, Inc., New York (1994).
B. Travis et al., "Preparation of Purified KHSO5•H2O and $n$Bu4NHSO5 from Oxone by Simple and Efficient Methods", Eur. J. Org. Chem., 20, 3429-34 (2002).
S. Yang, et al., Tetrahedron, 63, 5184-5188 (2007).

* cited by examiner

*Primary Examiner* — Vasu Jagannathan
*Assistant Examiner* — Robert C Boyle
(74) *Attorney, Agent, or Firm* — Steven C. Bauman

(57) ABSTRACT

The present invention relates to new cure accelerator systems for anaerobic curable compositions. These anaerobic cure systems include tetraalkyl ammonium oxidizing salts that are soluble in the (meth)acrylate component of the composition.

9 Claims, 3 Drawing Sheets

ANAEROBIC CURE SYSTEMS FOR AN ANAEROBIC CURABLE COMPOSITIONS, AND ANAEROBIC CURABLE COMPOSITIONS CONTAINING SAME

BACKGROUND

1. Field

The present invention relates to new cure accelerator systems for anaerobic curable compositions. These anaerobic cure systems include tetraalkyl ammonium oxidizing salts that are soluble in the (meth)acrylate component of the composition.

2. Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

The peroxy initiator is oftentimes cumene hydroperoxide ("CHP"). CHP has a distinctive odor, which to some people is found to be objectionable. Even when formulated into anaerobic adhesives, the odor is said to still be noticed by those people finding it objectionable.

Efforts have been made to seek alternatives to CHP. For instance, U.S. Pat. No. 3,980,627 (McDowell) is directed to and claims an anaerobic sealant composition having an extended shelf life in the presence of air and capable of polymerization upon exclusion of air. The composition includes a polyacrylic ester monomer represented by a certain formula; an inorganic salt as the sole polymerization initiator (and selected from ammonium perchlorate, alkali metal perchlorate, alkaline earth metal perchlorate, ammonium persulfate, alkali metal persulfate, and alkaline earth metal persulfate), present in an amount sufficient to initiate polymerization of the monomer in the absence of air; an accelerator present in an amount sufficient to accelerate polymerization of the monomer in the absence of air; and a polymerization inhibitor in an amount sufficient to retard polymerization of the monomer during storage of the composition in the presence of air.

In the '627 patent, it is suggested that the inorganic salt initiator is insoluble in the polyacrylate ester monomer and thus heating is suggested to influence its solubility. Even after heating, some of the salt remains undissolved. Thus, prior to use of the composition as an adhesive, filtration or decantation is performed. More specifically, column 3, line 58-column 4, line 17 of the '627 patent reads:

The anaerobic sealant compositions are compounded by first admixing predetermined amounts of the polyacrylate ester monomer and the inorganic salt initiator. Thereafter the accelerator is added, and the resulting admixture is aged until anaerobic properties are developed. If desired, a portion of the inorganic salt initiator to be added to the composition can be first dissolved in the accelerator and then added to the monomer as a solution. Aging of the prepared admixture can be carried out at room temperature or above. The necessary aging period depends to some extent on the aging temperature since anaerobic properties are developed in the formulation within a relatively shorter time period at elevated temperatures. Aging temperatures up to about 200° F. are suitable. At ambient temperature the compounded formulations preferably are aged for at least about 2 days. At elevated temperatures, for example, at about 120° F., the formulations preferably are aged about 1 day. After aging, any solid materials present in the produced anaerobic composition are filtered out or otherwise removed, e.g., by centrifuging and decanting the composition.

Recently, CHP has come under regulatory scrutiny in certain jurisdictions in which anaerobic adhesives are marketed and sold.

In an effort to passivate that regulatory scrutiny, Henkel Corporation has invested time and energy to design and develop new alternative anaerobic cure systems. One such way is the subject of this disclosure, and is described below.

SUMMARY

The present invention provides new anaerobic cure systems for anaerobic curable compositions, and anaerobic curable compositions including such anaerobic cure systems. The anaerobic curable compositions themselves are typically used as adhesives or sealants.

The anaerobic cure systems include tetraalkyl ammonium oxidizing salts that are soluble at room temperature in the (meth)acrylate component of the composition.

Tetraalkylammonium oxidizing salts were synthesized, and found to have significantly improved solubility at room temperature in the (meth)acrylate component of the composition over their respective sodium and potassium equivalents. Examples of the salts will be described in more detail below.

These salts were evaluated in anaerobic curable compositions and were found to have activity consistent with that of CHP, a conventional oxidizing agent in anaerobic cure systems. The chemistry of the synthesis as it relates to tetrabutyl ammonium salts (specifically, a persulfate salt) is shown below:

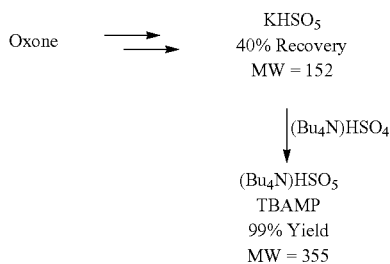

The addition of these materials into anaerobic curable compositions as a replacement for some or all of the amount of conventional anaerobic cure components that acts as oxidants in the anaerobic cure system [such as peroxides, like cumene hydroperoxide ("CHP")] surprisingly provides comparable cure speeds and physical properties for the reaction products formed therefrom.

This invention also provides anaerobic curable compositions prepared with such anaerobic cure systems, methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

DETAILED DESCRIPTION

Figure 1:
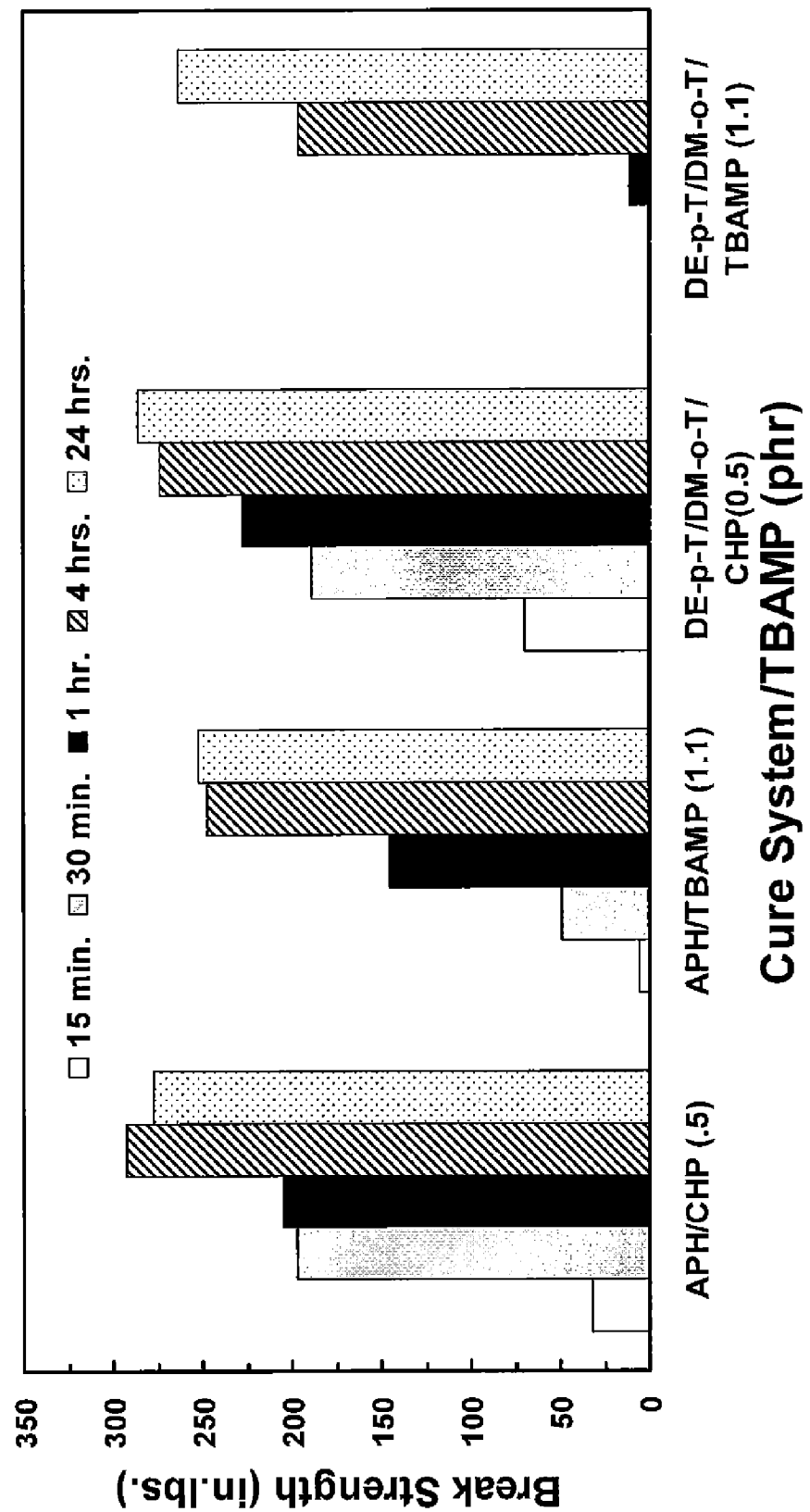
FIG. 1 depicts a bar chart of break strength of formulations with tetrabutylammonium monopersulfate ("TBAMP") and acetyl phenyl hydrazine ("APH") and diethyl-para-toluidine/dimethyl-ortho-toluidine ("DE-p-T/DM-o-T") cure systems, with a formulation having a CHP cure system as the control.

The present invention provides an anaerobic cure system comprising tetraalkyl ammonium oxidizing salts that are soluble in the (meth)acrylate component of the composition. The addition of such a tetraalkyl ammonium oxidizing salt in anaerobic curable compositions as a replacement for some or all of the amount of conventional anaerobic cure components, surprisingly provides comparable cure speeds and physical properties for the reaction products formed.

Anaerobic curable compositions generally are based on a (meth)acrylate component, together with an anaerobic cure-inducing composition. Here, the anaerobic cure-inducing composition is the inventive anaerobic cure system described herein. More specifically, the present invention provides an anaerobic curable composition, which beyond the (meth) acrylate component; includes an anaerobic cure system comprising a tetraalkyl ammonium salt as an oxidant and at least one of a phenyl hydrazine or a toluidine as a reductant. Optionally, the anaerobic cure system further comprises maleic acid.

(Meth)acrylate monomers suitable for use as the (meth) acrylate component in the present invention may be chosen from a wide variety of materials, such as these represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Other (meth)acrylate monomers may also be used, such as reaction products of the diglycidylether of bisphenol-A with methacrylic acid and a (meth)acrylate ester corresponding to structure as shown below:

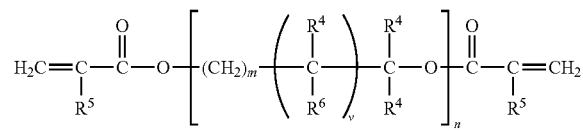

where $R^4$ may be selected from hydrogen, alkyl groups having from 1 to about 4 carbon atoms, hydroxyalkyl groups having from 1 to about 4 carbon atoms or

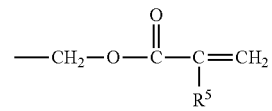

$R^5$ may be selected from hydrogen, halogen, and alkyl groups of from 1 to about 4 carbon atoms;

$R^6$ may be selected from hydrogen, hydroxy and

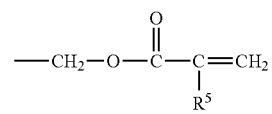

m is an integer equal to at least 1, e.g., from 1 to about 8 or higher, for instance, from 1 to about 4;

v is 0 or 1; and n is an integer equal to at least 1, e.g., 1 to about 20 or more.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

As noted above, the anaerobic cure systems include tetraalkyl ammonium oxidizing salts that are soluble in the (meth)acrylate component of the composition. The tetraalkyl ammonium salts were formed by cationic exchange from their respective inorganic oxidizing salts, as described below.

Examples of the tetraalkyl portion of the ammonium salts suitable for use herein as a component of an anaerobic cure system include tetramethyl, tetraethyl, tetrapropyl, and tetrabutyl ammonium salts and combinations thereof (such as for instance methyl diethyl or methyl, ethyl, dibutyl), and hydroxylated or alkoxylated derivatives thereof. Particularly desirable examples are tetrabutyl ammonium salts.

The salt is made with the counter anion. For instance, sulfur-, boron- or phosphorous-containing anions may serve as the counterion for the tetraalkyl ammonium salts. More specifically, sulfates, such as Oxone® or persulfate (like monopersulfate), borates, such as perborates, or phosphates, such as perphosphates may act as the counter anion to form the salt.

The amount of the tetraalkyl ammonium oxidizing salt useful in the anaerobic cure system is effective between 0.1 and 10, such as 1 and 5 percent by weight. The anaerobic cure system may be used in amounts of about 0.5 to about 10 percent by weight, such as about 0.5 to about 5 percent by weight, desirably 1 to about 3 percent by weight, based on the total weight of the composition. When used in combination with conventional accelerators (as discussed below; though at lower levels, for such conventional accelerators), the inventive accelerators should be used in amounts of about 0.01 to about 5 percent by weight, such as about 0.02 to about 3 percent by weight.

One or more maleimide components, thermal resistance-conferring coreactants, diluent components reactive at elevated temperature conditions, mono- or poly-hydroxyalkanes, polymeric plasticizers, and chelators (see U.S. Pat. No. 6,043,327 (Attarwala), the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical accelerators, inhibitors of free radical generation, as well as metal catalysts, such as iron and copper.

A number of well-known initiators of free radical polymerization are typically incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

In the present invention, some or all of such peroxide compounds may be eliminated in favor of the oxidants of the inventive anaerobic cure systems.

Conventional accelerators of free radical polymerization may also be used in conjunction with the phenylene diamine cure accelerators, though in amounts less than that used in the past. Such cure accelerators are typically of the hydrazine variety (e.g., APH), as disclosed in U.S. Pat. Nos. 4,287,350 (Rich) and 4,321,349 (Rich). One benefit of the present invention is that the phenylene diamine cure accelerators render the use of such accelerators optional in preparing anaerobic adhesive compositions.

Co-accelerators of free radical polymerization may also be used in the compositions of the present invention including, without limitation, organic amides and imides, such as benzoic sulfimide (also known as saccharin).

Other co-accelerators of free radical polymerization include sulfinimides and oxygen and sulfur derivatives thereof, sulfonimides and oxygen and sulfur derivatives thereof, sulfonamides and oxygen and sulfur derivatives thereof, and the oxygen and sulfur analogues of sulfimides. For instance, the inventive cure accelerators may be within structure I

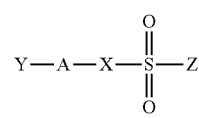

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded from within structure I. Particular examples of such accelerators include the following sulfonimides, sulfonamides, and oxygen and sulfur analogues of benzoic sulfimides:

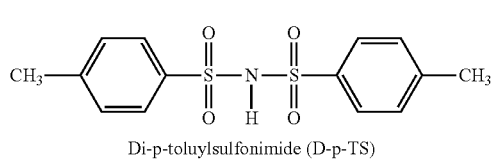

Di-p-toluylsulfonimide (D-p-TS)

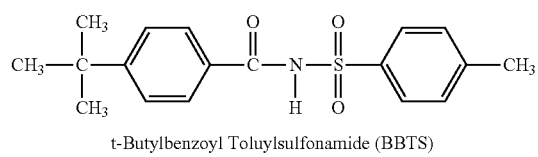

t-Butylbenzoyl Toluylsulfonamide (BBTS)

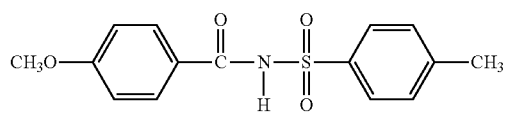

Methoxybenzoyl Toluylsulfonamide (MBTS)

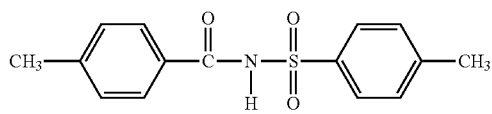

Methylbenzoyl Toluylsulfonamide (MeBTS)

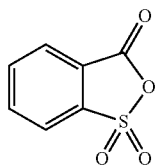

Sulfobenzoic Acid Cyclic
Anhydride (SBCA)

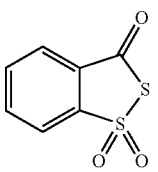

3H-1,2-Benzodithiol-3-one-
1,1-dioxide (BDTD)

See U.S. Pat. No. 6,958,368.

Still other co-accelerators of free radical polymerization include those within structure VIII

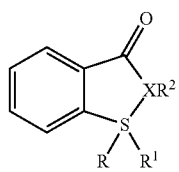

where R and $R^1$ may or may not be present, but when at least one is present it is S=O; X is N or S; and $R^2$ is hydroxyl or alkoxy. More specifically, R and $R^1$ should be present and are S=O; X is N; and R is hydroxyl or an alkoxy ether, such as an alkoxy cycloaliphatic ether.

Particular examples of such accelerators thus include the following sulfonamide derivatives described and claimed in U.S. Pat. No. 7,411,009:

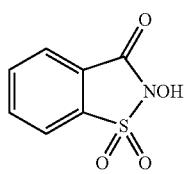

N-Hydroxy saccharin
(NHS)

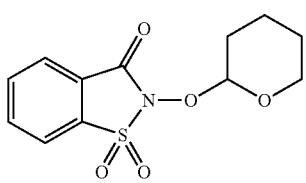

2-(N-Tetrahydropyranyloxy)-1,2-
benzisothiazol-3(2H)-one
1,1-dioxide (NTS)

Still other co-accelerators of free radical polymerization include those within structure XI

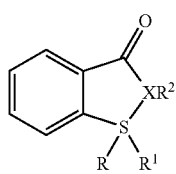

where R and $R^1$ may or may not be present, but when at least one is present it is S=O; X is N or S; and $R^2$ is halogen or a Group I element, which may be in hydrated form. More specifically, R and $R^1$ should be present and are S=O; X is N; and $R^2$ is chlorine, sodium or its hydrated form.

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelators may ordinarily be present in the compositions in an amount from about 0.001 percent by weight to about 0.1 percent by weight, based on the total weight of the composition.

Metal catalyst solutions or pre-mixes thereof are used in amounts of about 0.03 to about 0.1 percent by weight. Other agents such as thickeners, non-reactive plasticizers, fillers, toughening components (such as elastomers and rubbers), and other well-known additives may be incorporated therein where the art-skilled believes it would be desirable to do so.

The present invention also provides methods of preparing and using the inventive anaerobic cure systems and the anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The compositions of this invention demonstrate particularly good bond strength on steel, glass and aluminum. An appropriate primer may be applied to a surface of the chosen substrate to enhance cure rate. Or, the anaerobic cure system may be used as a primer itself. See e.g. U.S. Pat. No. 5,811,473 (Ramos).

The invention also provides a process for preparing a reaction product from the anaerobic adhesive composition of the present invention, the steps of which include applying the composition to a desired substrate surface and exposing the composition to an anaerobic environment for a time sufficient to cure the composition.

Of course, the present invention also provides for a bond formed between two mated substrates with the inventive composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate these new anaerobic cure systems as compared with conventional anaerobic cure systems by timed adhesion tests of model anaerobic adhesive composition on nut/bolt specimens constructed from steel.

Certain inorganic oxidizing salts were converted into their respective tetrabutylammonium salts by cation exchange. These salts, which are soluble at room temperature in the (meth)acrylate component of the anaerobic adhesive composition, directly added into model anaerobic adhesive composition for evaluation as the oxidizing curative in the anaerobic cure system.

$^1$H NMR analyses were performed with DMSO-$d_6$ as solvent on a 300 MHz Varian NMR System. Infrared spectra were obtained on a Perkin Elmer Spectrum One FTIR Spectrometer equipped with a Universal ATR sampling accessory.

Tetrabutylammonium hydrogensulfate, Oxone® monopersulfate compound, Oxone® tetrabutylammonium salt and sodium perborate were purchased from the Aldrich Chemical Company. All materials were used as received without further purification.

Initially, the tetralkyl ammonium salts that are present in the anaerobic cure system were synthesized as follows:

Synthesis of Tetraalkylammonium Oxidizing Salts

Tetrabutylammonium Monopersulfate ("TBAMP")

Potassium monopersulfate was obtained following a procedure consistent with B. Travis et al., *Eur. J. Org. Chem.,* 20, 3429-34 (2002).

Oxone® (30.7 g, 50 mmol) was placed into a 250 mL Erlenmeyer flask. Deionized $H_2O$ (30.7 mL) was added and swirled for 5 minutes until the noticeable fizzing subsided (internal temperature 11° C.). The slurry was filtered and washed with cold, deionized $H_2O$ (3.0 mL). With the aid of pH paper with 0.2 pH unit gradations, the pH of the filtrate was adjusted to 3.5 by addition of solid $KHCO_3$ (5.3 g) with stirring. The initial pH of this clear solution was about 1.0 and at the endpoint a pink color was observed. The pink slurry was filtered and the solid was washed twice with MeOH (31 mL) into the original water filtrate, resulting in the formation of more precipitate in the filtrate. This precipitate was again filtered and washed with MeOH (31 mL). The slightly cloudy solution containing water and MeOH was placed in the freezer overnight to crystallize the purified product. The thick slurry was filtered and washed four times with 20 mL each of $Et_2O$. The product was vacuum dried for one hour at ambient temperature under high vacuum. Recovery Yield=6.8 g, (40%); IR (neat) 3259, 1298, 1235, 1071, 1058, 749 cm$^{-1}$.

Potassium monopersulfate (6.8 g, 40 mmol), tetrabutylammonium hydrogensulfate (14.2 g, 42 mmol), and water (50 mL) were combined in a 125 mL Erlenmeyer flask. The solution was stirred at ambient temperature for a period of time of 30 minutes. The solution was then poured into a 125 mL separatory funnel, and the water layer was extracted three times with 50 mL each of $CH_2Cl_2$. The organic layers were combined, dried over anhydrous $MgSO_4$, and filtered. Solvent was removed under reduced pressure, and a white, crystalline product was obtained and vacuum dried for a period of time of one hour at a temperature of 30° C. Yield=14.1 g (99%). $^1$H NMR (DMSO-$d_6$) δ 0.95 (t, 12, 0.9), 1.3 (q, 8, $CH_2$), 1.6 (m, 8, $CH_2$), 3.2 (m, 8, N—$CH_2$); IR (neat) 3222, 2960, 2874, 1487, 1263, 1222, 1057, 877, 750 cm$^{-1}$.

Tetrabutylammonium Perborate ("TBAPB")

TBAPB was synthesized in a procedure consistent with that disclosed by S. Yang, et al., *Tetrahedron,* 63, 5184-5188 (2007).

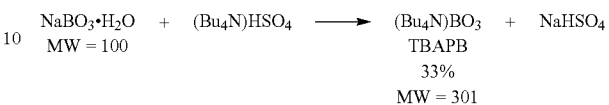

Sodium perborate (5.0 g, 5 mmol) and tetrabutylammonium hydrogen sulfate (18.6 g, 55 mmol) were dissolved in water (50 mL) in a 250 mL Erlenmeyer flask equipped with a magnetic stirring bar. The reactants were stirred for five hours at ambient temperature, after which time the reaction mixture was extracted three times with $CH_2Cl_2$ (50 mL). The organic layers were combined, dried over anhydrous $MgSO_4$, and filtered. Solvent was removed under reduced pressure, and the white, crystalline product was dried under high vacuum for one hour at 30° C. Yield=5.0 g (33%); $^1$H NMR (DMSO-$d_6$) δ 0.95 (t, 12, 0.9), 1.3 (q, 8, $CH_2$), 1.6 (m, 8, $CH_2$), 3.2 (m, 8, N—$CH_2$), 5.8 (s, $H_2O$); IR (neat) 2967, 2875, 1458, 1382, 1234, 1154, 1075, 960, 881, 837, 729 cm$^{-1}$.

Anaerobic Adhesives With Tetraalkylammonium Salts

Persulfate Containing Anaerobic Adhesive

TBAMP was formulated into model anaerobic adhesive compositions with APH and DE-p-T/DM-o-T cure systems, and compared with CHP containing composition. While the amount is listed as parts per hundred ("phr"), in practice all amounts are measured in grams. Thus, phr and grams may be used interchangeably throughout the examples and figures.

Samples were prepared from the noted components in the listed amounts in Table 1, by mixing with a mechanical stirrer in plastic vials.

TABLE 1

| Components | | Sample/Amt. (phr) | | | |
|---|---|---|---|---|---|
| Type | Identity | A | B | C | D |
| (Meth)acrylate | PEGMA | 100 | 100 | 100 | 100 |
| Conventional | Saccharin | 1.73 | 1.73 | 1.73 | 1.73 |
| Anaerobic | APH | 0.25 | 0.25 | — | — |
| Cure System | DE-p-T | — | — | 0.6 | 0.6 |
| | DM-o-T | — | — | 0.31 | 0.31 |
| Inventive Anaerobic Oxidant | TBAMP | — | 1.1 | — | 1.1 |
| Conventional Peroxide | CHP | 0.5 | — | 0.5 | — |
| Acid | Maleic Acid | 0.5 | 0.5 | — | — |

Perborate Containing Anaerobic Adhesive

Tetrabutylammonium perborate salt was formulated into model anaerobic adhesive compositions with APH and DE-p-T/DM-o-T cure systems, and compared with a CHP containing composition.

Samples were prepared from the noted components in the listed amounts in Table 1A, by mixing with a mechanical stirrer in plastic vials.

TABLE 1A

| Components | | Sample/Amt. (phr) | | | |
|---|---|---|---|---|---|
| Type | Identity | E | F | G | H |
| (Meth)acrylate | PEGMA | 100 | 100 | 100 | 100 |
| Conventional | Saccharin | 1.73 | 1.73 | 1.73 | 1.73 |
| Anaerobic | APH | 0.25 | 0.25 | — | — |
| Cure System | DE-p-T | — | — | 0.6 | 0.6 |
|  | DM-o-T | — | — | 0.31 | 0.31 |
| Inventive Anaerobic Oxidant | TBAPB | — | 1.1 | — | 1.1 |
| Conventional Peroxide | CHP | 0.5 | — | 0.5 | — |
| Acid | Maleic Acid | 0.5 | 0.5 | — | — |

Tetrabutylammonium Oxone® Containing Anaerobic Adhesive

Tetrabutylammonium Oxone® (available commercially from Aldrich) was formulated into model anaerobic adhesive compositions with APH and DE-p-T/DM-o-T cure systems, and compared with a CHP containing composition.

Samples were prepared from the noted components in the listed amounts in Table 1B, by mixing with a mechanical stirrer in plastic vials.

TABLE 1B

| Components | | Sample/Amt. (phr) | | | |
|---|---|---|---|---|---|
| Type | Identity | I | J | K | L |
| (Meth)acrylate | PEGMA | 100 | 100 | 100 | 100 |
| Conventional | Saccharin | 1.73 | 1.73 | 1.73 | 1.73 |
| Anaerobic | APH | 0.25 | 0.25 | — | — |
| Cure System | DE-p-T | — | — | 0.6 | 0.6 |
|  | DM-o-T | — | — | 0.31 | 0.31 |
| Inventive Anaerobic Oxidatant | TBAO | — | 1.1 | — | 1.1 |
| Conventional Peroxide | CHP | 0.5 | — | 0.5 | — |
| Acid | Maleic Acid | 0.5 | 0.5 | — | — |

Performance of Tetrabutylammonium Oxidizing Salt Containing Anaerobic Adhesives

Figure 2:
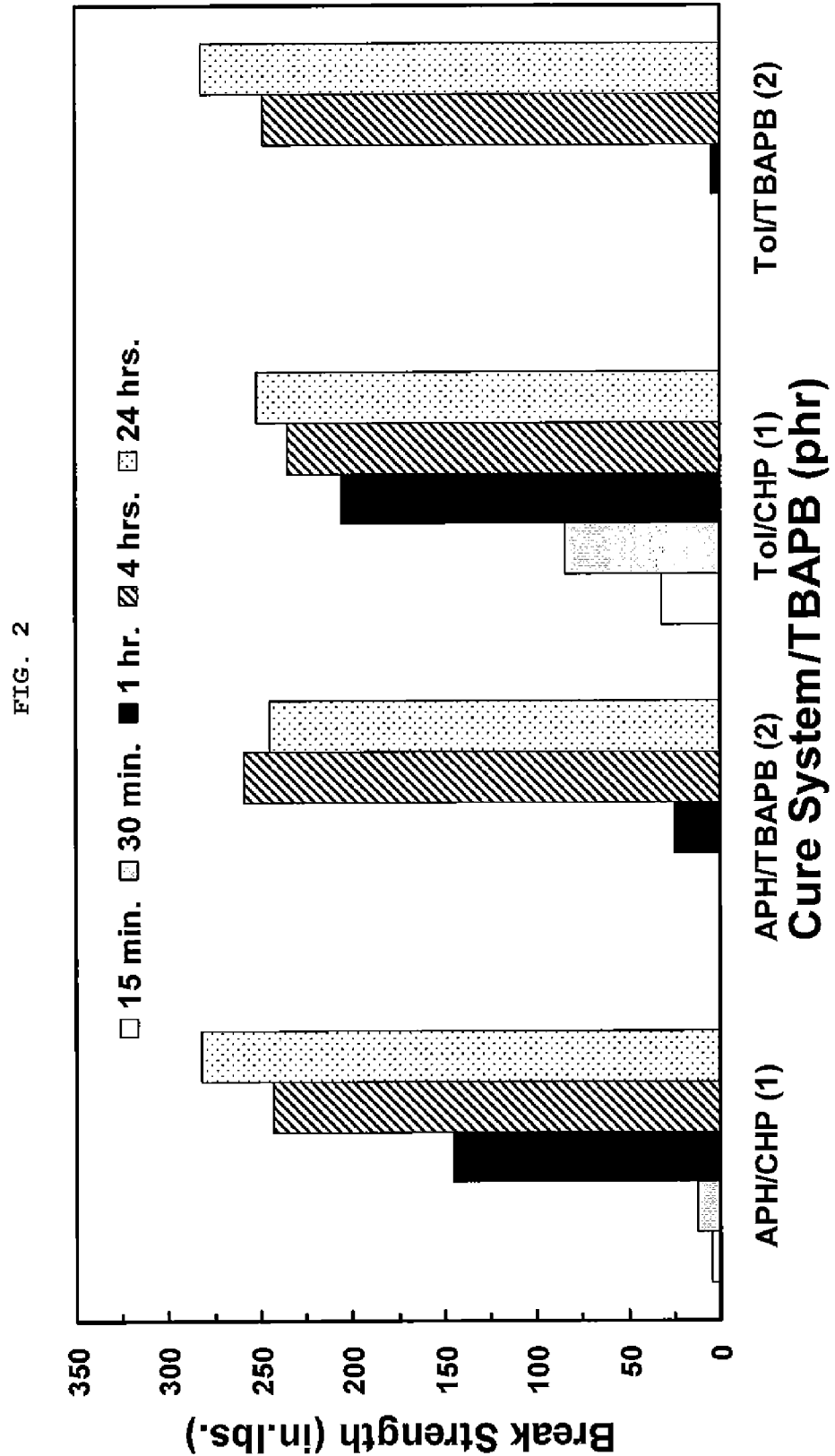
FIG. 2 depicts break strength of formulations with tetrabutylammonium perborate ("TBAPB") and the APH and DE-p-T/DM-o-T cure systems, with a formulation having a CHP cure system as the control.

The development of break strength over time, measured at certain increments up to 24 hours, is shown in FIG. 2. For the break/prevail adhesion tests, the specimens were maintained at ambient temperature for a number of time intervals, and evaluated for performance. The time intervals were: 15 minutes, 0.5 hour, 1 hour, 4 hours and 24 hours. The break strengths were observed and recorded for the specimens at ambient temperature for these time intervals. The torque strengths were measured with a calibrated torque wrench.

At a molar concentration of TBAMP equal to 1 phr of CHP, the formulations gelled before they could be tested. The concentration of TBAMP was reduced to half, and the formulations were sufficiently stable to be tested. The development of break strength over time, measured at certain increments up to 24 hours, is shown in FIG. 1.

TBAMP works well as an oxidizing curative in the APH cure systems, compared to the CHP controls. However, the cure speed of the TBAMP containing composition in the toluidine cure system (Sample D) is somewhat slower than that of the CHP control (Sample C).

TBAPB accelerated anaerobic cure in the cure systems, though more slowly than the CHP control but ultimately reaching the same strength. See FIG. 2.

Figure 3:
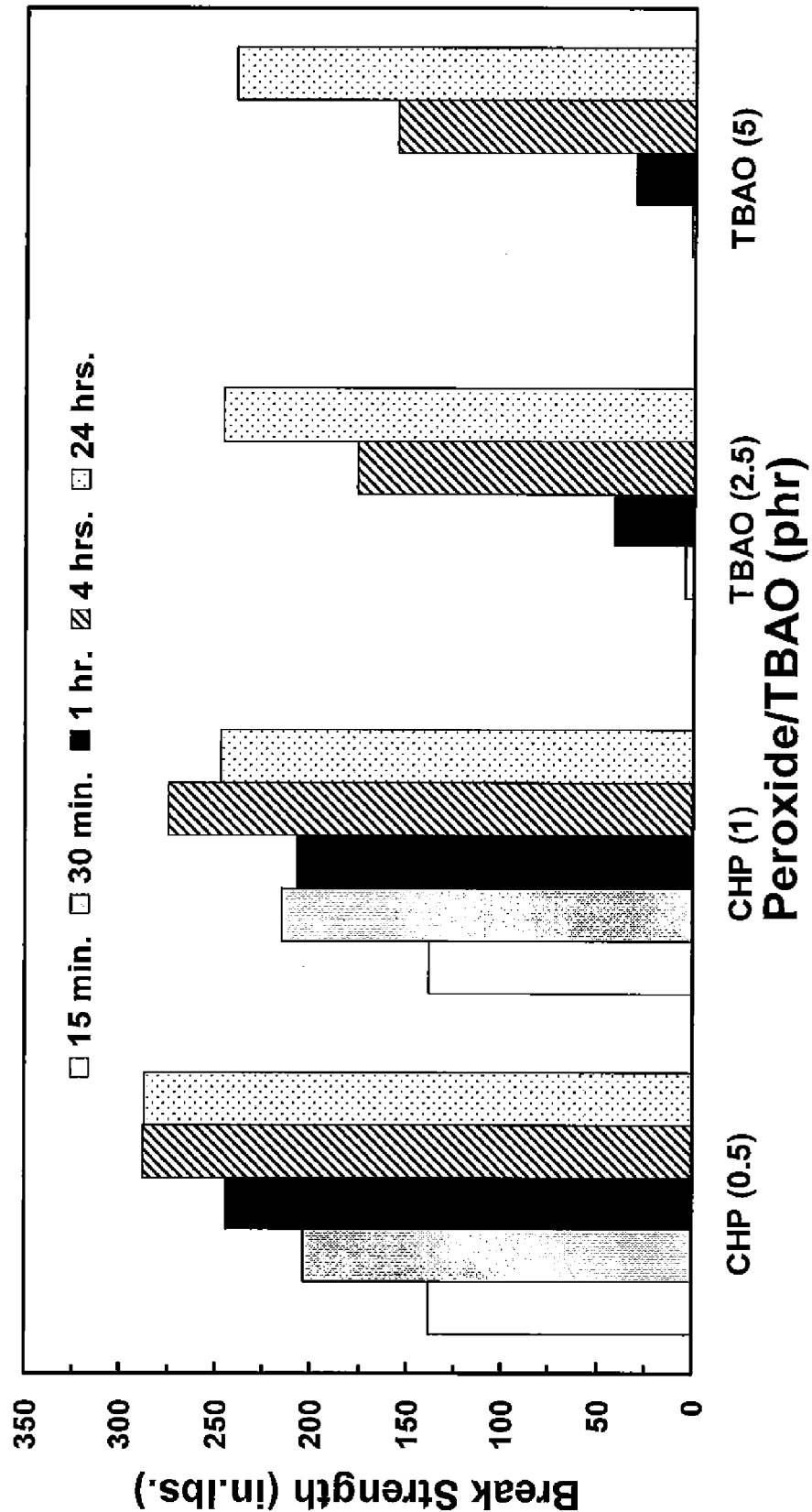
FIG. 3 depicts break strength of formulations with tetrabutylammonium boric acid oxide ("TBAO") and a DE-p-t/DM-o-T cure system, with a formulation having a CHP cure system as the control.

TBAO accelerated anaerobic cure in the cure systems, though more slowly than the CHP control but ultimately reaching the same strength in the APH containing samples. The toluidine containing samples were too unstable and cured within 24 hours after preparing the formulation. See FIG. 3.

What is claimed is:

1. An anaerobic curable composition, comprising:
   (a) a (meth)acrylate component; and
   (b) an anaerobic cure system comprising saccharin and the combination of a tetraalkyl ammonium salt as an oxidant and a phenyl hydrazine as a reductant or the combination of a tetraaklyl ammonium salt as an oxidant and a toluidine as a reductant wherein the tetraaklyl ammonium salt is a member selected from the group consisting of tetrabutylammonium monopersulfate, tetrabutylammonium perborate and tetrabutylammonium oxone.

2. The composition according to claim 1, wherein the anaerobic cure system further comprises maleic acid.

3. The composition according to claim 1, wherein the tetraalkyl ammonium salt comprises tetramethyl, tetraethyl, tetrapropyl, and tetrabutyl ammonium salts and combinations thereof, and hydroxylated or alkoxylated derivatives thereof.

4. The composition according to claim 1, wherein the (meth)acrylate component is represented by $H_2C=CGCO_2R^1$, wherein G is a member selected from the group consisting of H, halogen and alkenyl having from 1 to about four carbon atoms, and $R^1$ is a member selected from the group consisting of alkyl, cycloalkyl, alkenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

5. The composition according to claim 1, wherein the (meth)acrylate component is a member selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

6. The composition of claim 1, wherein the tetraalkyl ammonium salt is present in amounts of about 0.5 to about 10 percent by weight.

7. Reaction products of the composition according to claim 1.

8. A process for preparing a reaction product from an anaerobic curable composition, comprising the steps of:
   apply an anaerobic curable composition according to claim 1, to a desired substrate surface and
   exposing the composition to an anaerobic environment for a time sufficient to cure the composition.

9. A bond formed between two mated substrates with the composition of claim 1.

* * * * *